United States Patent [19]

Seto

[11] Patent Number: 4,645,351
[45] Date of Patent: Feb. 24, 1987

[54] METHODS AND APPARATUS FOR DISCRIMINATING BETWEEN THE FRONT AND BACK SURFACES OF FILMS

[75] Inventor: Yasuhiro Seto, Kaisei, Japan

[73] Assignee: Fuji Photo Film Co., Ltd., Kanagawa, Japan

[21] Appl. No.: 613,342

[22] Filed: May 23, 1984

[30] Foreign Application Priority Data

Jun. 1, 1983 [JP] Japan .................................. 58-97577
Jun. 20, 1983 [JP] Japan ................................ 58-110647
Jun. 30, 1983 [JP] Japan ................................ 58-119827

[51] Int. Cl.[4] .............................................. G01N 21/00
[52] U.S. Cl. ...................................... 356/443; 250/201
[58] Field of Search ............................... 356/443–444, 356/389–390, 381–382, 355–358, 71, 123; 250/559, 571, 556, 201 DF, 201 PF; 355/38, 68

[56] References Cited

U.S. PATENT DOCUMENTS

| | | | |
|---|---|---|---|
| 3,611,764 | 10/1971 | Asano | 356/430 X |
| 3,744,916 | 7/1973 | Bey et al. | 356/382 |
| 3,807,870 | 4/1974 | Kalman | 250/571 X |
| 4,120,590 | 10/1978 | Bieringer et al. | 356/382 |
| 4,167,678 | 9/1979 | Mischo et al. | 250/559 |
| 4,180,741 | 12/1979 | Palmatier et al. | 250/559 |
| 4,355,903 | 10/1982 | Sandercock | 356/382 |
| 4,365,895 | 12/1982 | Shaber et al. | 250/559 X |
| 4,518,234 | 5/1985 | Lamere | 356/443 X |
| 4,533,826 | 8/1985 | Van Alem | 250/201 DF |
| 4,591,271 | 5/1986 | Byers | 356/445 |

Primary Examiner—R. A. Rosenberger
Attorney, Agent, or Firm—Wenderoth, Lind & Ponack

[57] ABSTRACT

A method and apparatus for discriminating a surface of a developed film focuses a picture pattern on a film disposed at a reference position. One or two sensors are then located at focused positions of the picture pattern of the film when the front surface of the film is at the reference position and when the back surface of the film is at the reference position, respectively. The two resultant sensor outputs are then band-pass filtered to extract the portions of the outputs within a predetermined frequency range. The resultant outputs are then rectified and integrated and then compared by a comparator whose outputs is a first value when the front surface of the film is at the reference position and is a second different value when the back surface of the film is at a reference position.

6 Claims, 30 Drawing Figures

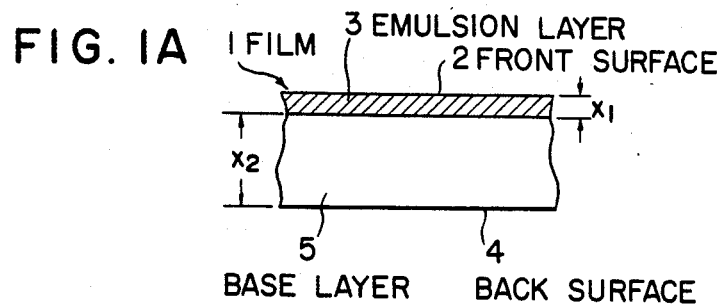
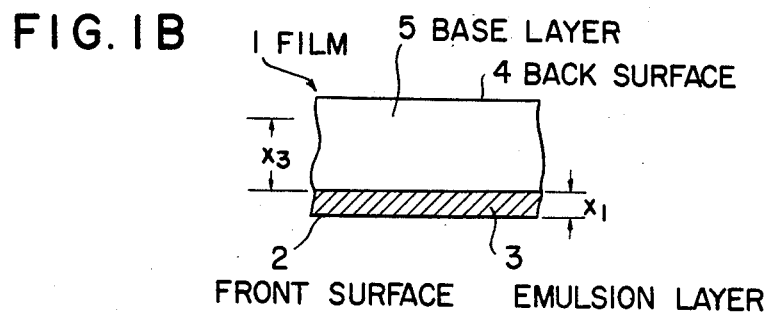
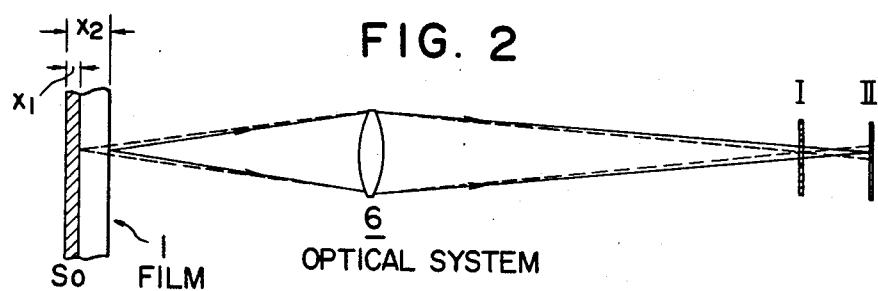
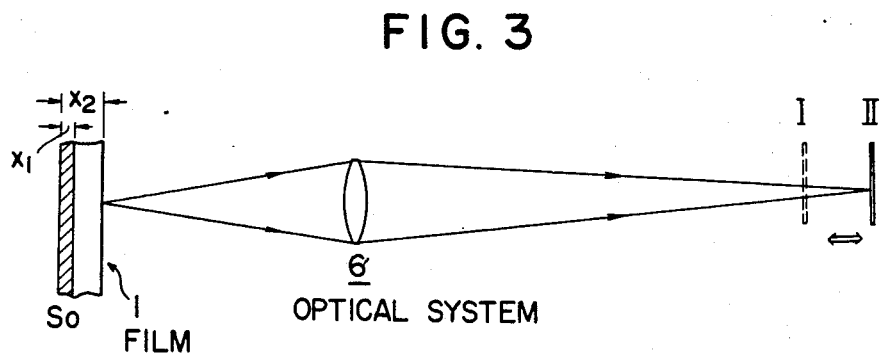

SF1

FS1

SF2

FS2

RC1

RC2

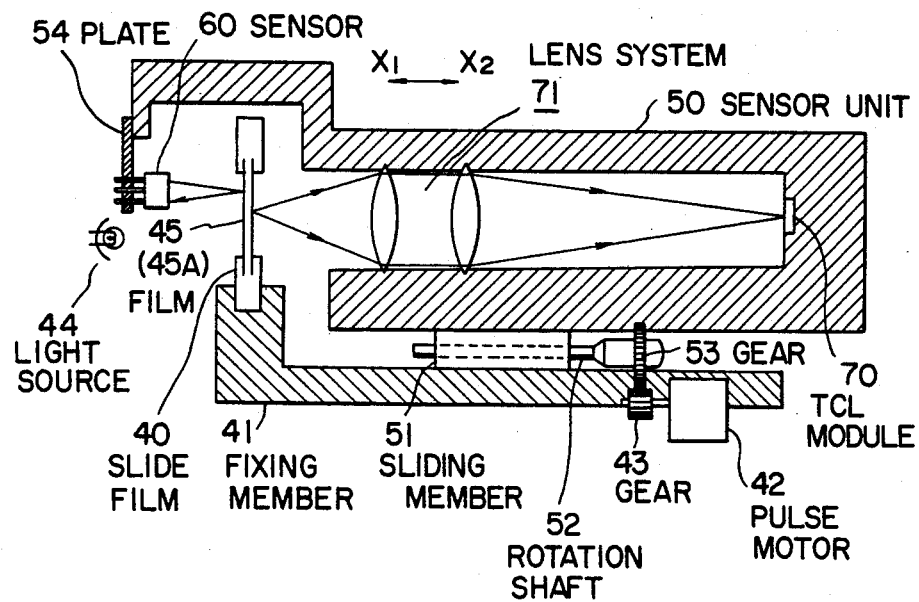
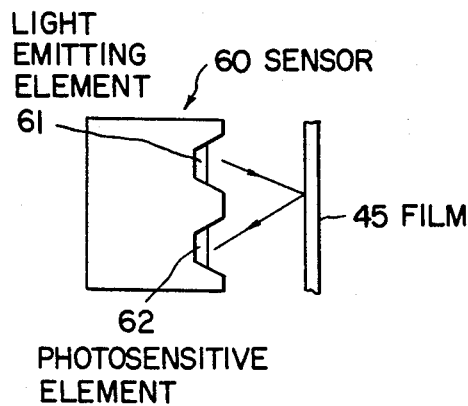
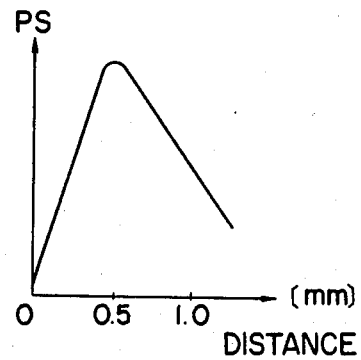

METHODS AND APPARATUS FOR DISCRIMINATING BETWEEN THE FRONT AND BACK SURFACES OF FILMS

BACKGROUND OF THE INVENTION

This invention relates to methods and apparatus for discriminating between the front and back surfaces of developed films.

The discrimination of the front and back surfaces of developed films in prior techniques was done by visually finding figures recorded on the films or by a manual judgement such as directly touching the films by hand. Such discrimination methods may always result in an inaccurate judegment, and particularly, the discrimination of the front and back surfaces of a mounted film (or slide film) which is fitted to a mount was very difficult. In addition, it will be necessary to take dirt or dust, or thermal deformation of the developed film into consideration as well as errors in assembling or working machine parts of an optical system for discriminating the surface (front or back) of the film.

SUMMARY OF THE INVENTION

A principal object of this invention is to provide methods and apparatus for easily and accurately discriminating between the front and back surfaces of a mounted film.

Another object of this invention is to provide a method and apparatus for the same purpose as described above when a glass-mount is used for protecting the mounted film from dirt, dust or thermal deformation.

A further object of this invention is to provide a calibration method applied to the surface discrimination methods and apparatus described above for mounted film or glass-mounted film for effectively amending or adjusting the discrimination methods.

According to this invention for achieving the objects described above, in one aspect thereof, there is provided a method for discriminating a surface of a developed film by detecting a position of an emulsion layer, i.e. a picture pattern formed on the developed film.

In another aspect of this invention, there is provided an apparatus for discriminating a surface of a developed film comprising an optical system for focusing a picture pattern on the film disposed on a reference position of the optical system, a first sensor located at a focused position of the picture pattern of the film when a front surface of the film is on the reference position, a second sensor located at a focused position of the picture pattern of the film when a back surface of the film is on the reference position, first and second band-pass filters operatively connected to the first and second sensors for extracting outputs therefrom within predetermined frequency ranges, respectively, first and second rectifiers operatively connected to the first and second band-pass filters for rectifying outputs therefrom, respectively, first and second integrators operatively connected to the first and second rectifiers for integrating outputs therefrom, respectively, and a comparator operatively connected to the first and second integrators for comparing outputs therefrom.

In a further aspect of this invention, there is provided an apparatus for discriminating a surface of a developed film comprising an optical system for focusing a picture pattern of the film disposed on a reference position of the optical system, a sensor arranged so as to be movable between a first focusing position of the picture pattern of the film when a front surface of the film is on the reference position and a second focusing position of the picture pattern of the film when the back surface of the film is on the reference position, a band-pass filter operatively connected to the sensor for extracting an output therefrom with a predetermined frequency range, a rectifier operatively connected to the band-pass filter for rectifying an output therefrom, an integrator operatively connected to the rectifier for rectifying an output therefrom, and a comparator operatively connected to the integrator for comparing the outputs from the integrator generated in cases where the sensor is positioned at the first and second picture pattern focusing positions.

In a still further aspect of this invention, there are provided a method and apparatus for discriminating a surface of a developed film in which is utilized a glass mounted film prepared by attaching glass sheets having the same thickness on both surfaces of the developed film.

In a still further aspect of this invention, there are provided a method and apparatus in which is utilized a calibration member prepared by a flat and non-deformable transparent base having one surface which is subjected to a picture treatment for amending or correcting errors caused in the measurements in the surface discrimination operation.

According to this invention, a front or back surface of a developed film can exactly be discriminated by detecting a position of an emulsion layer, i.e. picture pattern, formed on the film used in an optical system. The method and apparatus for realizing this fact are applicable to a glass mounted film, and in this example, the thickness of the glass-sheets attached to the developed film is preliminarily measured and the measured result can be introduced into the surface discrimination. In addition, errors or offset amounts caused in the measurements can be corrected or compensated for by utilizing a calibration method or member according to this invention. Thus, the surface of the developed film can be exactly discriminated.

BRIEF DESCRIPTION OF THE DRAWINGS

In the accompanying drawings:

FIGS. 1A and 1B are vertical sectional views showing the relationship of the front and back surfaces of a film to be applied to this invention;

FIGS. 2 and 3 are schematic views showing optical systems for explaining the principle of this invention;

FIG. 6 is a longitudinal sectional view of another embodiment of this invention;

FIGS. 7 and 9 are views showing structures of film surface detecting sensors used for the embodiments shown in FIG. 6;

FIG. 8 is a graph showing the characteristics of the sensor shown in FIG. 7 or 9;

DESCRIPTION OF THE PREFERRED EMBODIMENTS

Figure 4:
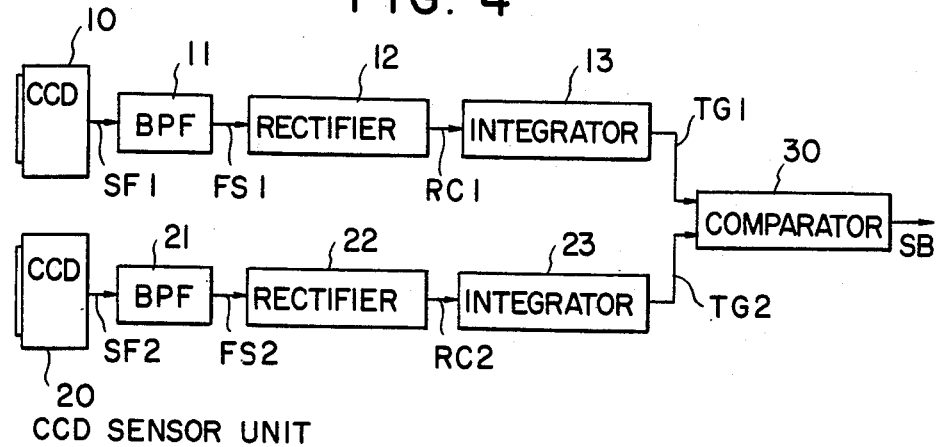
FIG. 4 is a block diagram representing a main embodiment of this invention.

Referring to FIGS. 1A and 1B which briefly show a film 1 after the developing procedure; an emulsion layer 3 with a picture pattern is formed with a thickness $x_1$ (about 20–27 μm in the case of 135 mm-reversal film) from the front surface 2 of the film 1; a base layer 5 is also formed with a thickness $x_2$ (about 127 μm in the case of 135 mm-reversal film) from the back surface 4 of the film 1. A distance $x_3$ between the emulsion layer 3 with the front and back surfaces of the film 1 being contacted as shown in FIGS. 1A and 1B is about 100 μm. On the basis of the fact that there exists a difference of about 100 μm between the thicknesses of the emulsion layers 3 formed on the front and back surfaces of the film 1, surface discrimination of the film can be performed by detecting the positions of the emulsion layers 3 on the front and back surfaces 2 and 4 of the film 1.

For example, when a developed film 1 is set at a reference position So of an optical system 6 as shown in FIG. 2, the position of the emulsion layer 3 of the film 1 becomes offset with respect to the reference position So in accordance with the fact that the front or back surface of the film 1 contacts the reference position So. Taking the above fact into consideration, by focusing a picture pattern (emulsion layer 3) of the film 1 by using the optical system 6, the picture pattern is focused at a different position in accordance with the surface (front or back) of the film 1 contacting the reference position So. Namely, in FIG. 2, the dotted lines show a case where the front surface 2 of the film 1 contacts the reference position So and the picture pattern is focused at a position I and the solid lines show a case where the back surface 4 of the film 1 contacts the reference position So and the picture pattern is focused on a position II. Therefore, since the front or back surface of the film 1 contacts the reference position So, discrimination of the Focused position I or II can be accurately performed. This means in the other aspect that the picture pattern can be sharply focused at the position I but is defocused at the position II when the front surface 2 of the film 1 contacts the reference position So, and reversely, the picture pattern can be sharply focused at the position II but is defocused at the position I when the back surface 4 of the film 1 contacts the reference position So.

As described above, according to this invention, since the front or back of the film 1 contacts the reference position So, the discrimination of the focused position I or II can be accurately performed by the method comprising the steps of causing the film 1 to contact the fixed reference position So, focusing a picture pattern of the film 1 by means of the optical system 6, the disposing optical sensors or detectors at the positions I and II mentioned above so as thereby discriminate the focused conditions of the picture patterns at the positions I and II, i.e. to detect the position of the emulsion layer 3.

FIG. 3 shows a state that the emulsion layer 3, i.e. picture pattern, of the film 1 will be detected by using one optical sensor, which can be shifted from the position I to he position II or vice versa to detect the focused condition of the picture pattern on the positions I and II and to thereby discriminate the surface (front or back) of the film 1 contacting the reference position So.

In case of using an optical system 6 having the magnification of three times, a distance between the focused positions I and II is approximately 300 μm at the time when the front or back surface of the film 1 contacts the reference position So. Such a distance is sufficient for detecting the picture patterns at the positions I and II. The distance therebetween can of course be elongated by using an optical system having a magnification of more than three times.

FIG. 4 is a block diagram showing an apparatus realizing the discrimination method according to this invention, in which CCD (Charge Coupled Device) sensor units 10 and 20 are positioned at focused positions I and II, respectively, and band-pass filters (BPF) 11 and 21 are located for extracting outputs of the signals SF1 and SF2 from the CCD sensor units 10 and 20 at predetermined frequency ranges. The outputs of the signals FS1 and FS2 from the band-pass filters 11 and 21 are rectified by rectifiers 12 and 22. Signals RC1 and RC2, rectified by the rectifiers 12 and 22, are inputted into and integrated by integrators 13 and 23, respectively, and the integrated values TG1 and TG2 are then inputted into a comparator 30. The CCD sensor units 10 and 20 transmit electrical level (logic) signals representing the picture pattern or image of the film disposed in contact with the reference position So in accordance with the advance of the optical scanning lines, and the levels correspond to the image densities of the film.

Figure 5A:
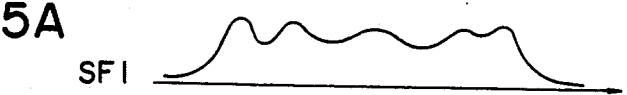
FIGS. 5A through 5F are graphs showing wave-form characteristics representing operation of the block diagram shown in FIG. 4.
Figure 5B:
Figure 5C:
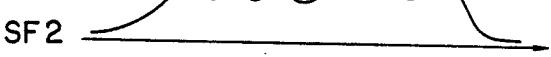
Figure 5D:
Figure 5E:
Figure 5F:
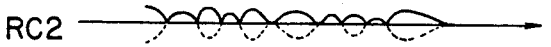

With the construction described hereinabove, during one picture scan of the film set at the reference position So are outputted detected signals SF1 and SF2 from the CCD sensor units 10 and 20, for example, as shown in FIGS. 5A and 5C, respectively. At this operation, the frequency components of the signals SF1 and SF2 outputted from the CCD sensor units 10 and 20 correspond to the defocused conditions of the picture pattern of the film 1. In other words, since the defocused condition is in a small extent, when the picture pattern is sharply focused, a difference between densities of adjacent picture elements becomes large and the frequency component becomes high. On the other hand, when the defocused condition is in a large extent, the image density difference becomes low. In the illustrated example, the CCD sensor unit 10 outputs the signal SF1 with a low frequency and the CCD sensor unit 20 outputs the signal SF2 with a high frequency. These signals SF1 and SF2 are inputted respectively into the band-pass filters 11 and 21 and only the signal components within the predetermined frequency ranges are extracted, which are shown in FIGS. 5B and 5D, respectively. The low and high frequency components of the respective signals SF1 and SF2 are eliminated by the band-pass filters 11 and 21, from which the frequency components only in the predetermined ranges are then outputted. After the extraction of the signals SF1 and SF2 with the predetermined frequency components, those signals SF1 and SF2 are rectified and converted by the rectifiers 12 and 22 into d.c. components having only position components as shown in FIGS. 5E and 5F, respectively, and the d.c. components RC1 and RC2 are integrated by the integrators 13 and 23. In these cases, since the level of the integrated value TG1 from the integrator 13 becomes small and the level of the integrated value TG2 of the integrator 23 becomes large, the comparator 30 transmits a discrimination signal SB as an output of logic "1", for example, in comparison with these levels and discriminations the fact that the back surface of the film exactly contacts the reference position So. This is based on the fact that the higher the frequency component of the signal passing the band-pass filter, the larger becomes the level of the signal rectified by the rectifier. Namely, when the signal passing the band-pass filter has a high frequency component, i.e., when the defocused condition of the picture pattern of the film detected by the CCD sensor unit is small, the value integrated by the integrator becomes large. In the embodiment illustrated in FIG. 4, a pair of the CCD sensor units, the band-pass filters, the rectifiers, and the integrators are located, respectively, so that one CCD sensor unit is disposed at the position I and the other CCD sensor unit is disposed at the position II. However, in an alternative modification, one respective CCD sensor unit, band-pass filter, rectifier, and integrator may be located, and in this case, the CCD sensor unit is shifted from the position I to the position II or vice versa to thereby discriminate the defocused conditions of the focused images of the film on the positions I and II. In this modified embodiment, an integrated value by the integrator at position I or II is stored in a memory, for example, and the stored value is then compared by the comparator.

Since the principle of this invention resides in a discrimination of the surface (front or back) of a film made by detecting the position of an emulsion layer, i.e. the picture pattern with respect to the film surface, the discrimination thereof can be made by detecting the position of the emulsion layer relative to the position of the film surface.

FIG. 6 shows an embodiment of this invention realizing the fact described above. Referring to FIG. 6, a slide film 40 in which a film 45 is mounted is vertically fitted at a predetermined set position of a projection located at one end of a fixing member 41 which is not movable and to which a pulse motor 42 as a driving source is attached. The fixing member 41 includes a flat portion which extends from the projection and on this flat portion is mounted a sliding member 51 to which a cylindrical sensor unit 50 is secured, the sliding member 51 being provided with a longitudinal axial threaded bore into which a rotation shaft 52 is engaged so that the whole structure of the sensor unit 50 can be moved in an $X_1-X_2$ direction when the shaft 52 is rotated. The rotation shaft 52 is itself supported by the fixing member 41 through a gear 53, located at one end thereof, which in turn is engaged with a gear 43 attached to the drive shaft of the pulse motor 42 to thereby move the sensor unit 50 in the $X_1-X_2$ direction in accordance with the operation of the pulse motor 42.

In front of the slide film 40 fitted to the fixing member 41, is arranged at light source 44 which is used with a sensor 60 described below for optically detecting a picture pattern (emulsion layer) position. The sensor unit 50 is provided with a front portion having a shape for covering the fitted slide film 40 thereabove. The sensor 60 for optically detecting a film surface of the slide film 40 is attached to a plate 54 suspended from the endmost portion of the front portion of the sensor unit 50. A TCL (Through Camera Lens) module 70 is located at the rear end wall of the inner cylindrical portion of the sensor unit 50 for focusing the picture pattern of the slide film 40 with a lens system 71 and for detecting the position of the emulsion layer, i.e.—the picture pattern. The TCL module 70, the lens system 71, and the light source 44 constitute the picture pattern position detecting sensor of this invention.

Referring to FIG. 7, the film surface detecting sensor 60 comprises a light emitting element 61 such as light emitting diode and a photosensitive element 62 such as photodiode which are arranged side by side in the same direction. A light emitted from the light emitting element 61 is reflected by the film 45 and the reflected light is then received by the photosensitive element 62. Accordingly, in a case where the distance between the sensor 60 and the film 45 is considerably large, a relatively weak light reaches the surface of the film 45, and in this case, the reflected light reaches the photosensitive element 62 insufficiently and the level of the output signal is low. As the distance therebetween becomes small, the reflected light intensity as well as the light sensed increase. Moreover, in a case where the distance between the sensor 60 and the film surface 45 becomes very small, light emitted from the light emitting element 61 is emitted only on the surface of the film located at a position facing the light emitting element 61 and the light reflected from the film surface cannot be received by the photosensitive element 62 disposed at a position apart from the light emitting element, and the level of the output signal from the photosensitive element 62 reduces gradually.

The relationship of the output signal PS from the photosensitive element 62 with respect to the distance between the sensor 60 and the film 45 is shown in FIG. 8, in which a characteristic curve representing that relationship is shown. Thus, the distance therebetween can be obtained by the output signal PS from the photosensitive element 62 in light of the characteristic curve measured preliminarily, and the film surface can be detected by obtaining the peak of the characteristic curve.

Figure 9:
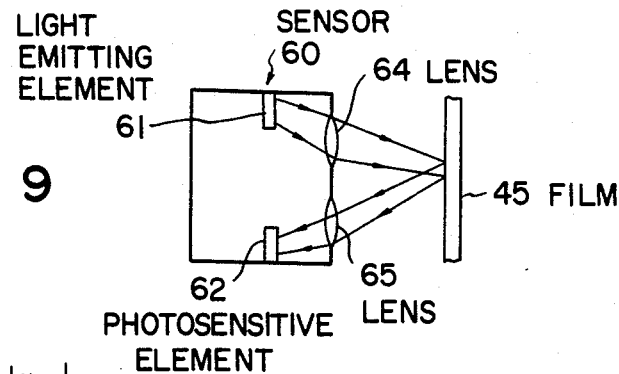

FIG. 9 is an illustration showing another example of the film surface detecting sensor 60, in which a light is emitted on the film surface through a lens 64 and the reflected light is sensed through a lens 65 to improve the directivity of the light.

The TCL module 70 described hereinbefore is a CCD application element widely used in an automatic focusing mechanism of a camera, for example, as described in "SHASHIN KOGYO (Photographic Industry)" published on December, 1982 and "NIKKEI ELECTRONICS" published on Aug. 30, 1982. In a case where the picture pattern of the slide film 40 is focused on the photosensitive surface of the TCL module 70, the pulsating focus coincidence signal PC is transmitted, and in the other cases, a front or back focusing signal is transmitted. Accordingly, the picture pattern of the slide film 40 can be detected at a time when the focus coincidence signal PC from the TCL module 70 is transmitted in accordance with the picture or image projected on the photosensitive surface of the TCL module 70 through the lens system 71, and it is confirmed that such position corresponds to the emulsion layer position of the film 45.

Figure 10A:
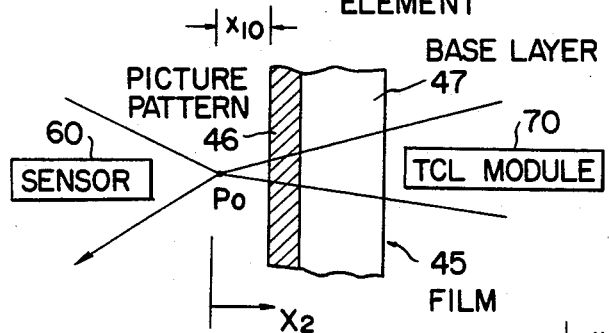
FIGS. 10A and 10B are views for explaining the detection principle of the sensor shown in FIG. 7 or 9.
Figure 10B:
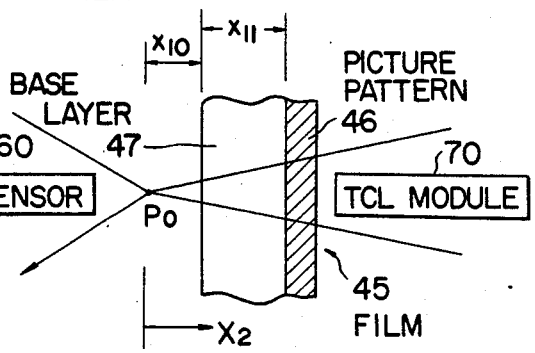

In the structure described above, supposing that a position at which the output signal PS of the film surface detecting sensor 60 becomes maximum coincides with a focusing position of the picture pattern position detecting sensor, and that the coincidence position or point Po is realized on the left side of the film 45 as viewed in FIG. 10A or 10B, the rotation shaft 52 is rotated by the driving of the pulse motor 42 through the engagement of the gears 43 and 53 and the sliding member 51 in screw engagement with shaft 52 slides on the fixing member 41 to thereby shift the sensor unit 50 in the direction $X_2$. According to the movement of the sensor unit 50 in the direction $X_2$, the point Po also moves in the same direction by a distance of $x_{10}$ and finally reaches the left end surface of the film 45. In this case, if the front surface of the film 45 exists on the lefthand side thereof as shown in FIG. 10A, the peak value of the signal PS from the surface detecting sensor 60 is detected, and at the same time, a focus coincidence signal PC is transmitted from the TCL module 70 of the picture position detecting sensor, when the sensor unit 50 moves in the direction $X_2$ by the distance X so that the point Po will reach the front surface of the film 45. On the other hand, in a case where the back surface of the film 45 exists on the left hand side as shown in FIG. 10B, the focus coincidence signal PC is not transmitted from the TCL module 70 and only the signal PS from the film surface detecting sensor 60 reaches its peak, even if the point Po moves in the direction $X_2$ by the distance x to reach the back surface of the film 45. In the latter case, the TCL module 70 detects the picture pattern 46 and transmits the focus coincidence signal PC when the sensor unit 50 is further moved in the direction $X_2$ by the distance $x_{11}$, i.e. the thickness of the base layer 47.

Figure 11:
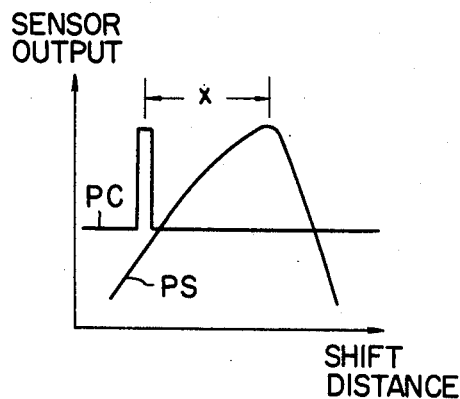
FIG. 11 is a graph representing the characteristic curve of the output of the sensor shown in FIG. 7 or 9.

As described above, accordingly, the front or back surface of the film can be exactly discriminated by detecting a distance x between the peak detecting position of the film surface detecting sensor 60 and the output position of the focus coincidence signal PC from the TCL module 70 as shown in FIG. 11. More specifically, in a case, shown in FIG. 10A, where the front surface of the film is on the lefthand side thereof, the distance x becomes zero, and in a case, shown in FIG. 10B, where the back surface of the film is on the lefthand side thereof, the distance x becomes $x_2$, i.e. the thickness $x_{11}$ of the base layer 47 of the film.

Although in the aforementioned example, a case where the point Po exists on the left side of the film 45 is discussed, it should of course be understood that substantially the same discussion will be applied to a case where the point Po exists on the right side of the film 45 and the sensor unit 50 is shifted in the direction $X_1$ as shown in FIG. 6 to discriminate the surface (front or back) of the film 45. A film applicable to this invention is a developed film having positions of the picture patterns different on the front and back surfaces thereof.

Although with the preferred embodiment of this invention mentioned hereinbefore, a normally mounted film is referred to, this invention can be applicable to a glass-mounted film, which is generally prepared by attaching thin glass sheets, having the same thickness, to both sides of the mounted (slide) film for protecting a developed film from dirt, dust, or thermal deformation at a sliding time.

Figure 12:
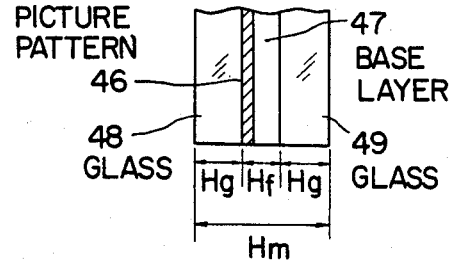
FIG. 12 is a vertical sectional view showing a part of a glass mounted film.

In the former embodiments, it is supposed that the position (called hereinafter position or point $P_1$) at which the output signal PS from the surface detecting sensor 60 becomes maximum would completely coincide with a focusing position (called hereinafter position or point $P_2$) of the picture pattern position detecting sensor. However, when a glass-mount film as shown in FIG. 12 is used, the distance x in the former embodiment shown in FIG. 11 includes an offset distance Hg which corresponds to the thickness of the glass sheets 48 and 49 attached to the mount film.

Taking the above fact into consideration, a further modified embodiment according to this invention will be described hereunder for discriminating the front or back surface of a glass-mount film by compensating for the offset of the distance x caused by attaching the glass sheets each having the thickness Hg, for example.

Figure 13:
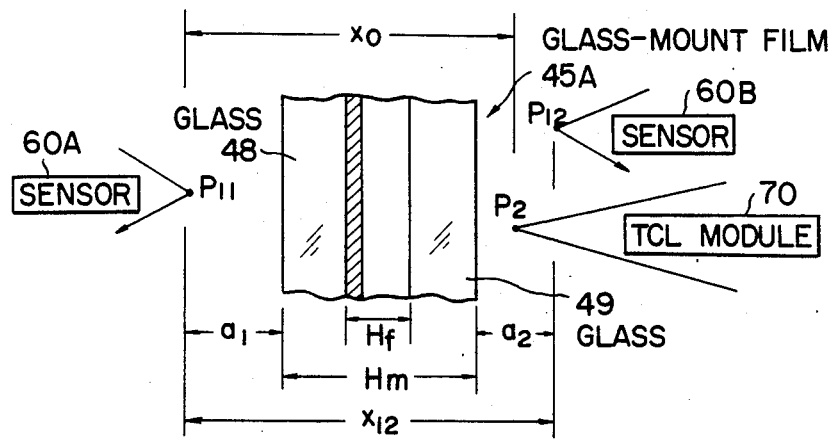
FIGS. 13, 14A, 14B, 15A, 15B, 16A, 16B, 17A and 17B are views for explaining the principle of one embodiment of this invention when a glass-mounted film is used.

Referring to FIG. 13, sensors 60A and 60B for detecting the film surface are disposed at positions interposing the glass-mount film 45A therebetween with a predetermined distance $x_{12}$. A distance $a_1$ between the surfaces of the sensor 60A and the glass sheet 48 is obtained by shifting the glass-mounted film 45A until the sensor 60A generates the maximum output signal, and a distance $a_2$ between the sensor 60B and the surface of the glass sheet 49 is obtained by shifting the glass-mount film 45A until the sensor 60B generates the maximum output signal. The thickness Hm of the glass-mount film 45A is calculated as follows:

$$Hm = x_{12} - (a_1 + a_2) \quad (1)$$

Supposing that the glass sheets 48 and 49 on both sides of the film had the same thickness of Hg, the thickness Hg can be obtained as follows:

$$Hg = (Hm - Hf)/2 \quad (2)$$

where Hf is the thickness of the original film provided with no glass sheets.

The glass-mounted film 45A is thereafter disposed between the surface detecting sensor 60A and the emulsion layer detecting sensor. The sensor unit 50 is then shifted to a position at which the output of the signal PS of the surface detecting sensor 60A becomes maximum (see FIG. 14A) and the data regarding this shifted position is stored into a memory. The sensor unit 50 is again shifted from this position in the direction $X_1$ to a position at which the focus coincidence signal is transmitted from the TCL module 70 (see FIG. 14B). As described above, there will be obtained a distance x' between a position at which the surface detecting sensor 60A detects the surface of the glass-mount film 45A and a position shown in FIG. 14B at which the focus coincidence signal PC is transmitted from the TCL module 70 of the emulsion layer position detecting sensor, and the measured distance $x_0$ will be in accord with the thickness Hg of the glass sheet in a case where the front surface of the film 45A is on the lefthand side thereof as viewed in FIG. 14A or 14B.

Figure 15A:
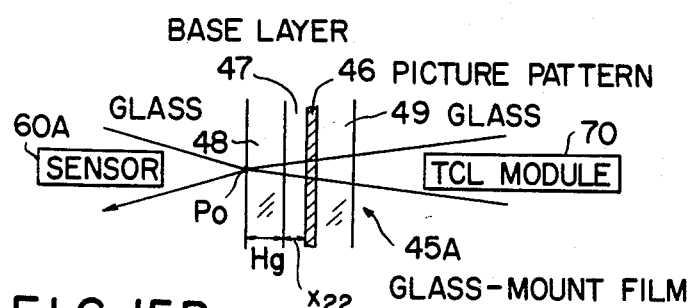
Figure 15B:
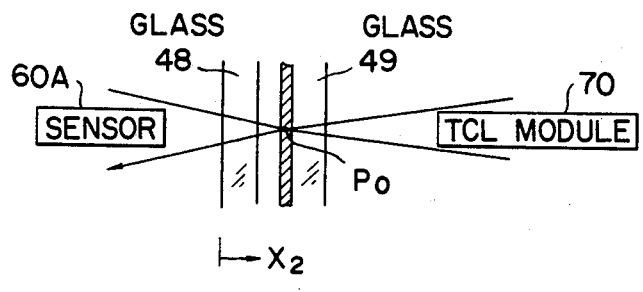

On the other hand, in a case where the back surface of the film 45A is on the lefthand side thereof as shown in FIG. 15A or 15B, the focus coincidence signal PC will not be outputted from the TCL module 70 even if the point Po is shifted from the position (FIG. 15A) at which the output of the detected signal PS from the surface detecting sensor 60A reaches its peak to the left side surface of the film by the distance Hg corresponding to the thickness of the glass sheet in the direction $X_2$. The focus coincidence signal PC will be transmitted (FIG. 15B) at a time when the sensor unit 50 is further shifted in the direction $X_2$ by the distance $x_{22}$ corresponding to the thickness of the base layer 47 of the film from the left side surface thereof to thereby detect the emulsion layer 46.

Figure 14A:
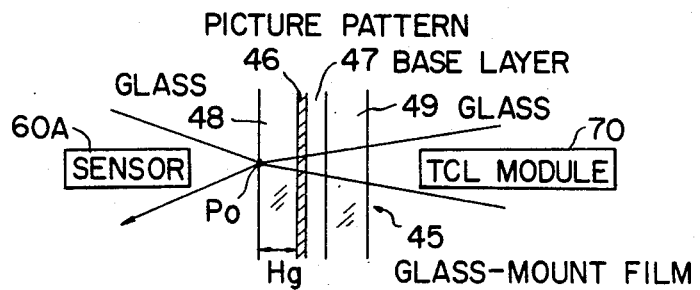
Figure 14B:
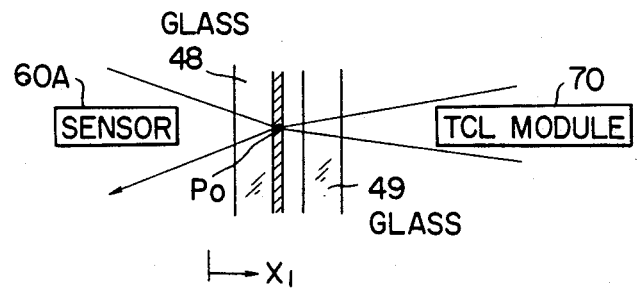

Accordingly, the surface (front or back) of the glass-mounted film can be discriminated by detecting the distance x' between the peak detecting position of the surface detecting sensor 60A and the focus coincidence signal PC outputting position. Namely, when the front surface of the film 45A is on the lefthand side thereof as shown in FIG. 14A or 14B, the following equation is established:

$$x' - Hg = 0 \qquad (3)$$

When the back surface of the film 45A is on the lefthand side, the following equation is established:

$$x' - Hg = x_{22} \qquad (4)$$

It will of course be understood that the surface discrimination can be achieved with a slight allowance for the measured values. For example, the value $(x' - Hg)$ can be compared with a value $x_{22}/3$ for the surface discrimination.

Figure 16A:
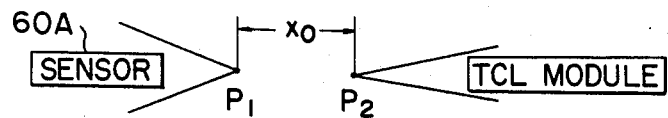
Figure 16B:
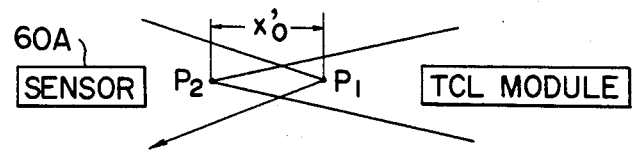
Figure 17A:
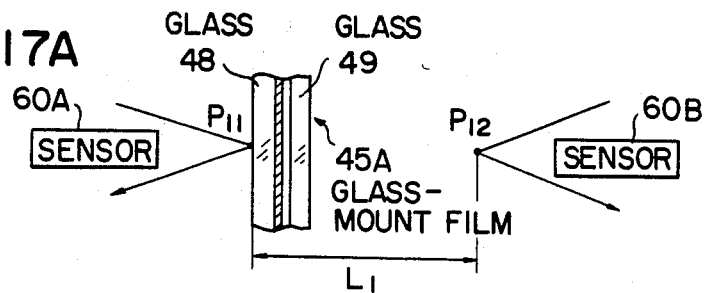
Figure 17B:
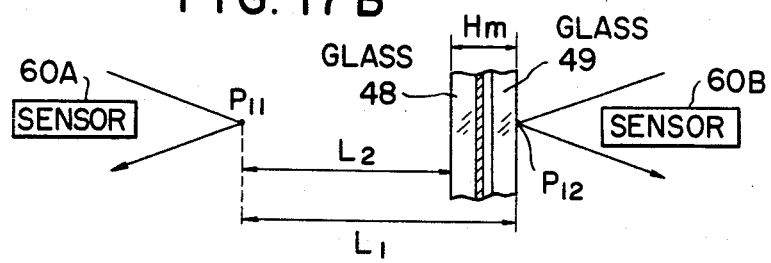

With the modified embodiment of this invention described hereinabove, although it is assumed that the position $P_1$ and the position $P_2$ referred to hereinbefore completely coincide with each other, the positions $P_1$ and $P_2$ may become offset in an actual operation as shown in FIG. 16A or 16B for the reason caused by an error in an actual assembly of the machine parts of an optical system, an error in working operation of the parts, or a deformation thereof with time. In such a case, the present invention can be applied by preliminarily measuring the distance $x_0$ between the points $P_1$ and $P_2$ for the discrimination of the film surface. In addition, the thickness Hm of the glass-mounted film may be measured by a direct mechanical method or by the paired surface detecting sensors 60A and 60B arranged relative to each other. In this example, the thickness Hm of the glass-mount film is obtained by the following equation (5):

$$Hm = L_1 - L_2 \qquad (5)$$

where $L_1$ is a distance between a position $P_{12}$ at which the surface detecting sensor 60B transmits a signal PSB representing the maximum output and a position $P_{11}$ at which the surface detecting sensor 60A transmits signal PSA representing the maximum output, and $L_2$ is distance between a position at which the position $P_1$ coincides with one surface of the glass mount film 45A and a position at which the position $P_2$ coincides with the other surface of the film 45A. (see FIGS. 17A and 17B).

According to this invention, the surface (front or back) of the glass-mounted film can be accurately discriminated by preliminarily measuring the thickness of the glass sheets attached on both sides of the developed film.

As described hereinbefore, with one modified embodiment of this invention in conjunction with FIG. 6, although it is assumed that the point $P_1$ (maximum output position of the signal PS from the film surface detecting sensor 60) and the point $P_2$ (focusing position of the emulsion layer position detecting sensor) completely coincide with each other, in an actual operation, these points $P_1$ and $P_2$ may sometimes become offset because of errors caused in assembling or during the working time of the mechanical parts of an optical system or the deformation thereof with time. In such a case, it becomes necessary to compensate for the error of the measured distance x between the points $P_1$ and $P_2$. A calibration method will be preferably applied to compensate for this error, which will be described hereinafter in conjunction with FIG. 6 showing the film surface discrimination apparatus according to one embodiment of this invention.

The apparatus shown in FIG. 6 generally comprises means for measuring the surface position of the film after being developed a means for measuring the emulsion layer on which a picture pattern of the film is formed, and circuit means for comparing the measured results from the surface position measuring means and the emulsion layer position measuring means and for discriminating the front or back surface of the film in accordance with the compared result.

In order to carry out the calibration method in use of the apparatus described above, the calibration member is arranged between the surface position measuring means and emulsion layer position measuring means, the calibration member being prepared by effecting a treatment of a picture easily focused by the emulsion layer position measuring means to a flat and non-deformable transparent base. An offset amount between the measured points obtained by the film surface position measuring means and the emulsion layer position measuring means is obtained by detecting one surface of the calibration member in the combined use of these measuring means. By inputting the obtained offset amount into the surface discriminating circuit, the circuit accurately discriminates the surface (front or back) of the film.

Regarding the offset amount between two points $P_1$ and $P_2$, two cases will be considered, one being shown in FIG. 16A in which two points $P_1$ and $P_2$ are a certain distance apart, the other being shown in FIG. 16B in which two points overlap by a certain distance.

Figure 18A:
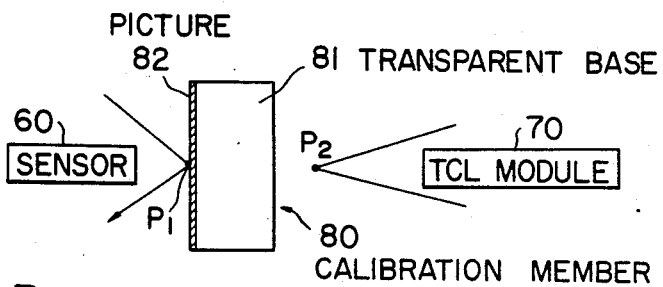
FIGS. 18A and 18B are views for explaining a calibration method applied to the embodiments described above according to this invention.
Figure 18B:
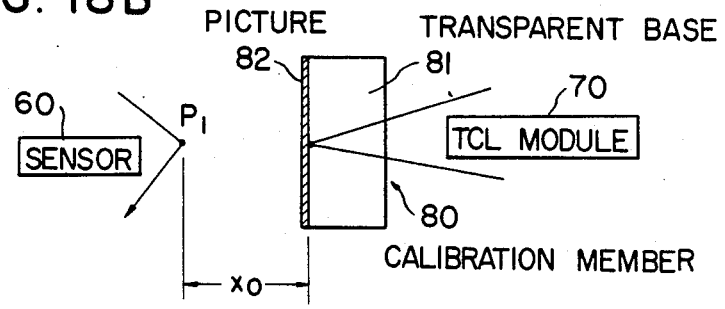

The case shown in FIG. 16A will be explained in connection with FIGS. 18A and 18B as follows. The calibration member 80 used for this invention is prepared as shown in FIGS. 18A and 18B by depositing or printing a picture or image 82 with a large contrast or density difference for easy focusing to one surface of a flat and non-deformable transparent base 81 (glass, for example). The calibration member 80 thus prepared is located between the film surface detecting sensor 60 and the emulsion layer position detecting sensor 50. The sensor unit 50 is shifted to a position at which the sensor 60 transmits the maximum output signal PS (FIG. 18A) and this position is stored in the memory. The sensor unit 50 is further moved from this position in the direction $X_1$ shown in FIG. 6 to a position at which the focus coincidence signal PC is transmitted from the TCL module 70 (FIG. 18B). Thus, the offset distance $x_0$ between the points $P_1$ and $P_2$ can be detected by obtaining the shifted distance of the sensor unit 50 from the position at which the film surface detecting sensor 60 detects the picture 82 of the calibration member 80 to the position at which the TCL module 70 of the emulsion layer position detecting sensor transmits the focus coincidence sigal PC. At this measuring time, it is necessary to make constant the direction of the picture 82 of the calibration member 80; that is, the measurement will have to be performed after confirming the fact that the picture 82 faces the point $P_1$ or $P_2$.

In a case, as described above, where there exists the offset $x_0$ between the points $P_1$ and $P_2$, the measured distance x, explained in conjunction with FIG. 11, includes the offset amount $x_0$ in a case shown in FIG. 10A. Accordingly, the surface (front or back) discriminating circuit can discriminate the surface of the film by subtracting the offset $x_0$ measured by the use of the calibration member 80 from the measured distance x.

That is, when the following equation is established, it can be discriminated that the left side surface of the film is the front surface thereof as shown in FIG. 10A.

$$x - x_0 = 0 \quad (6)$$

On the other hand, when the following equation is established, it can be discriminated that the left side surface of the film is the back surface thereof as shown in FIG. 10B.

$$x - x_0 = x_2 \quad (7)$$

Furthermore, in a case where the points $P_1$ and $P_2$ overlap as shown in FIG. 16B, the offset distance $x_0'$ between the points $P_1$ and $P_2$ can also measured by using the calibration member 80, and in the case shown in FIG. 16B, the surface (front of back) of the film can be discriminated by the following equations.

$$x + x_0' = 0 \quad (8)$$

$$x + x_0' = x_2 \quad (9)$$

It will of course be understood that the surface discrimination of this method can be achieved with a slight allowance for the measured values. For example, the value $(x - x_0)$ or $(x + x_0)$ can be compared with the value $x_2/2$ for the surface discrimination.

According to this invention, the surface of the developed film can be further exactly discriminated by preliminarily arranging a calibration member even if errors in assembling or working machine parts or a deformation of the film with time occur.

What is claimed is:

1. An apparatus for discriminating between a front surface and a back surface of a developed film comprising:
   an optical system for focusing a picture pattern on the film disposed at a reference position of said optical system;
   a first sensor located at a focused position of the picture pattern of the film when said front surface of the film is at said reference position;
   a second sensor located at a focused position of the picture pattern of the film when said back surface of the film is at said reference position;
   first and second band-pass filters operatively connected to said first and second sensors for respectively extracting outputs therefrom within predetermined frequency ranges;
   first and second rectifiers operatively connected to said first and second band-pass filters for respectively rectifying outputs therform;
   first and second integrators operatively connected to said first and second rectifiers for respectively integrating outputs therfrom; and
   a comparator operatively connected to said first and second integrators for comparing outputs therefrom, wherein an output of said comparator is a first value when said front surface of said film is at said reference position and is a second different value when said back surface of said film is at said reference position.

2. An apparatus as recited in claim 1, further comprising a calibration means comprising an easily focused image disposed upon one surface of a flat and non-deformable transparent base.

3. An apparatus for discriminating between a front surface and a back surface of a developed film comprising:
   an optical system for focusing a picture pattern of the film disposed at a reference position of said optical system;
   a sensor arranged so as to be movable between a first focusing position of the picture pattern of the film when said front surface of the film is at said reference position and a second focusing position of the picture pattern of the film when said back surface of the film is at said reference position;
   a band-pass filter operatively connected to said sensor for extracting an output therefrom within a predetermined frequency range;
   a rectifier operatively connected to said band-pass filter for rectifying an output therefrom;
   an integrator operatively connected to said rectifier for rectifying an output therefrom;
   a memory means operatively connected to said integrator for storing the value of an output therefrom; and
   a comparator operatively connected to said memory means for comparing stored values of the outputs from said integrator generated in cases when said sensor is positioned at said first and second picture pattern focusing positions, wherein an output of said comparator is a first value when said front surface of said film is at said reference position and is at a second different value when said back surface of said film is at said reference position.

4. An apparatus as recited in claim 3, further comprising a calibration means comprising an easily focused image disposed upon one surface of a flat and nondeformable transparent base.

5. A method for discriminating between a front surface and a back surface of a developed film comprising the steps of:
   focusing a picture pattern on the film disposed at a reference position of the optical system;
   providing a first sensor at a focused position of the picture pattern of the film when the front surface of the film is at the reference position;
   providing a second sensor at a focused position of the picture pattern of the film when the back surface of the film is at the reference position;
   filtering outputs from the first and second sensors with band-pass filters so as to extract outputs therefrom within predetermined frequency ranges;
   respectively rectifying outputs from the first and second band-pass filters with first and second rectifiers;
   integrating the respective outputs of the first and second rectifiers by means of first and second integrators; and
   comparing outputs from the first and second integrators with a comparator, wherein an output of the comparator is a first value when the front surface of the film is at the reference position and is a second different value when the back surface of the film is at the reference position.

6. A method for discriminating between a front surface and a back surface of a developed film comprising the steps of:
   focusing a picture pattern of the film disposed at a reference position of the optical system;
   providing a sensor which is moveable between a first focusing position of the picture pattern of the film when the front surface of the film is at the reference position and a second focusing position of the picture pattern of the film when the back surface of the film is at the reference position;

extracting an output from the sensor within a predetermined frequency range by means of a band-pass filter;

rectifying an output of the band-pass filter by means of a rectifier;

integrating an output of the rectifier by means of an integrator;

storing the value of an output from the integrator by means of a memory means; and comparing stored values of the outputs from the integrator generated in cases when the sensor is positioned at the first and second picture pattern focusing positions in a comparator, wherein an output of the comparator is a first value when the front surface of the film is at the reference position and is at a second different value when the back surface of the film is at the reference position.

* * * * *